W. C. GRIMES.
Rice Cleaner.
No. 1,803.
Patented Oct. 8, 1840.
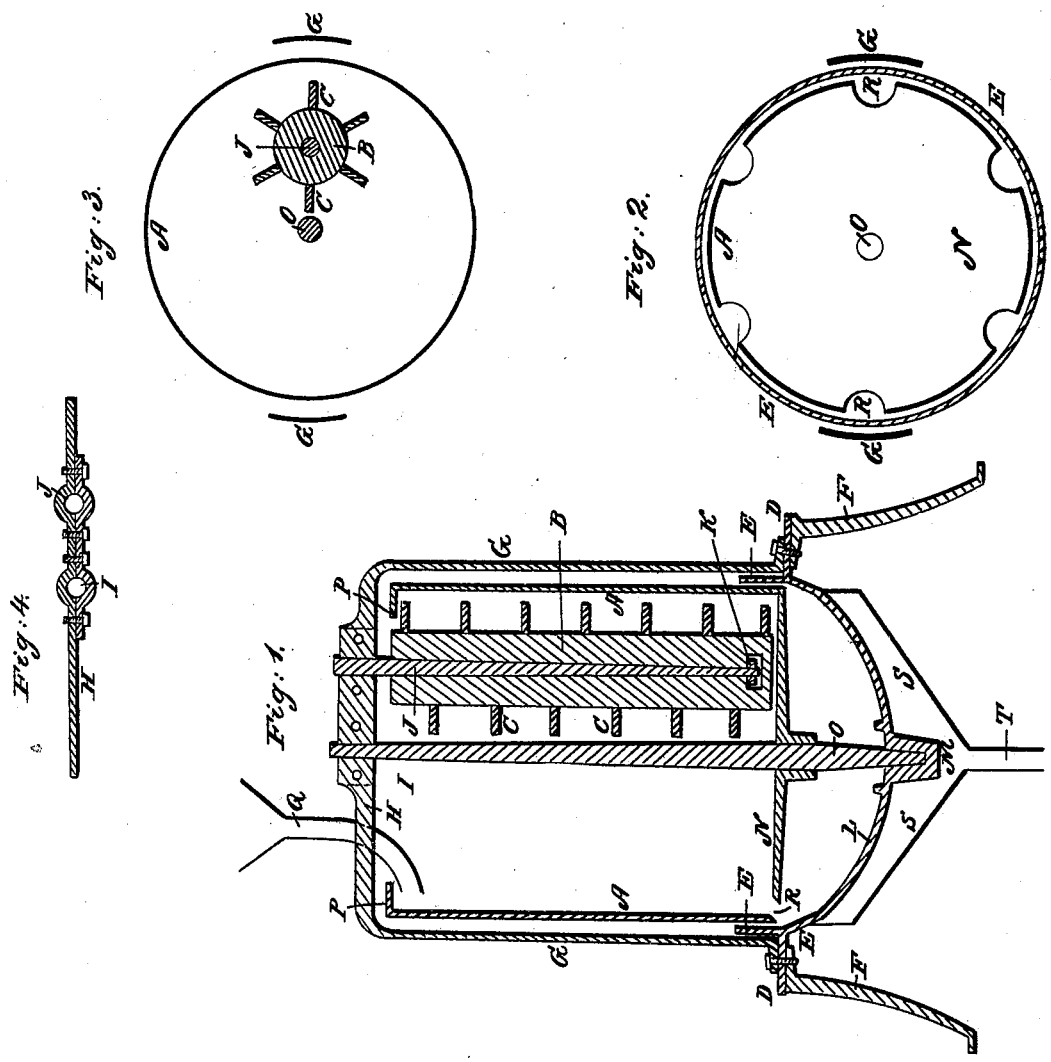

UNITED STATES PATENT OFFICE.

W. C. GRIMES, OF YORK, PENNSYLVANIA.

MACHINE FOR HULLING RICE.

Specification of Letters Patent No. 1,803, dated October 8, 1840.

*To all whom it may concern:*

Be it known that I, WM. C. GRIMES, of York, in the county of York and State of Pennsylvania, have invented a new and useful Machine for Hulling Rice and other Seed, and that the following is a full and exact description thereof, reference being had to the drawings which accompany and make part of this specification.

For hulling and scouring rice, no principle of action has been found, perhaps, more applicable or efficient, than the percussion of pestles or stampers acting upon a mass of it, more or less confined. But the manner of applying this action as heretofore, is imperfect, inasmuch as all reciprocating motion in a machine for this, or other similar purposes, must necessarily be.

In my machine, the motions of all the moving parts are rotary; while the action upon the rice or other seed, is similar to that of a pestle upon a dense and partially confined mass of it; while at the same time, it is constantly receiving at one point and discharging at another, no time being lost for that purpose.

This machine consists of a hollow, metallic cylinder A A which revolves rapidly upon its own axis. Within this cylinder, where the hulling is effected, revolves another, B, in the same direction, and about as much oftener as it is smaller in diameter. The axes of these cylinders are very eccentric, the great difference in their diameters allowing of this arrangement.

The periphery of the interior cylinder is studded with numerous pins, or projections, C C C of some two or three inches in length, and about half as much in diameter. At one point their outer ends approach to within about an inch of the inner surface of the hollow cylinder while on the opposite side, they are distant one-half, more or less, of its diameter. As the outer cylinder makes several hundred revolutions per minute, centrifugal force will cause the rice, or other seed, within, to lie densely around upon the inner surface of this rapidly whirling body; and when it has accumulated in depth sufficient to reach the ends of the pins or projections upon the interior cylinder, the latter will be set in motion thereby; and as the seed still accumulates in depth, the pins in their rapid rotation, will act as pestles or stampers upon the dense mass of it that lines the hollow cylinder. By this action the required hulling and polish will be given, while its tendency will be to produce an equal distribution of the rice or seed, along within the cylinder; hence a continued supply or feed at one end, will cause the mass within to advance toward the other, (where it is discharged) to restore the eqilibrium; yet the greatest mass or depth of seed will be found at the receiving end, when the cylinders are horizontal; but if in an upright position—as I intend in general to use them—this will not be the case in a sensible degree, if the runners are true cylinders and their axes parallel, but such a shape or taper may be given to the former, or inclination to the latter, that the seed will assume any distribution within the cylinder that may be desired.

A broad flange or ring, D D with a high collar, E E E, rising on either side of its inner edge, and resting upon feet, F F forms a base for the machine.

Two uprights or posts, G G rising from this base to the top of the cylinders, are there united by a bar H which forms a box or bearing, I for the upper journal or axis of the outer cylinder, and a support to the stationary axis J of the inner one. The latter I make tapering thickest at the point of suspension, as having, when the machine is in operation, to act as a lever of the third kind. Upon the lower end of this axis, which does not pass quite through is secured a circular nut K upon which the cylinder is borne. The aperture in the end of the cylinder, R which has been enlarged for the reception of the nut, is closed tight below it, to prevent the escape of the oil which is poured in above and fills whatever cavities may exist around the said axis; hence a perfect lubrication of the latter is easily maintained.

A narrow inverted arch L spans the large aperture at the base of the machine, forming at its center an oil box and bearing M for the lower journal of the hollow cylinder; which last rests upon, and is firmly attached to a strong metallic head N that forms the only connection between it, and its shaft or axis O.

The upper end of the cylinder or shell is partially closed by the flange P P which stands inward to prevent the rice or seed from being thrown over the top thereof. The rice, &c., is conducted into the machine by the tube Q and passes out through several lateral openings R R at the bottom of the cylinder; being discharged into the short stationary cylinder formed by the collar E E, falling thence into the funnel S S, it is conducted away by the tube T.

Motion is communicated to the machine by passing a belt around the outer cylinder. Or the machine may be so constructed as to receive a whirl upon its axis for that purpose. The cylinder A A which is made of strong sheet, or boiler iron, may be about two feet in diameter and the same in length.

The cylinder B I make of wood, strengthening it with iron bands, and drive into it the metallic or wooden pins C C. The funnels and tubes are made of sheet iron or tin; while the rest of the machine is composed principally of cast iron.

I intend sometimes to make the machine to work in a horizontal position, the cylinders revolving vertically, and standing like the chucks of a turning lathe; upon the ends of long and stout shafts or axes that project beyond their bearings for that purpose.

I have described my machine as having but one small cylinder armed with pins or projections, but I intend sometimes to use two or more such, acting within the one that revolves around them. I intend also, to use, sometimes, stationary asperities within the revolving cylinder, in place of, or in combination with the revolving pins or pestles.

I am aware that many mechanical processes are accomplished within, and by the rotation of a hollow cylinder; viz, paint has been ground, clothes and other articles are washed, chains, wire, shot, and various other articles are scoured, cleaned, and polished in this manner; but the cylinder in all cases heretofore has lain horizontally or but slightly inclined; and revolved with a speed that would allow gravitation to keep the material or articles at the lower side of the same. To give the cylinder a rapid motion, or an upright position, would defeat the accomplishment of either purpose above named, or any one similar, to which it has heretofore been applied; while in my machine the one is essentially necessary; the other unimportant; the machine performing with about the same result in any position.

I am aware too that an interior cylinder or sphere has been placed within, and revolved eccentric with a hollow cylinder or shell, to act in conjunction with the latter, upon the material to be ground or washed; but always without a fixed axis, and with a smooth surface; moving slow and irregular, and that merely in obedience to gravitation, by rolling down the ascending side of the cylinder. The strong characteristics that distinguish my machine from all others, and those too, which have borne the nearest resemblance to it, must now be sufficiently manifest.

Thus having fully shown and set forth the structure, principle, and operation of my machine, alluded to the different modifications of which it is susceptible; and illustrated by comparison, its permanent and peculiar characteristics, I would now observe that I do not mean to confine or limit myself to the precise form or structure described, but intend to change and vary the same, as experience may suggest or convenience require, so long as the principles of action, and the results obtained remain unchanged.

What I claim as new and as my invention, and desire to secure by Letters Patent, is—

1. The mode of hulling rice, seed, or grain, by means of the combined action, of a rapidly revolving hollow cylinder, and one or more smaller cylinders, armed with pins, teeth, or projections, revolving upon a fixed axis and operating as set forth, it being eccentric with, and within the former; where the hulling and scouring is effected, the said projections acting upon the rice or seed while it densely lines by centrifugal force, the inner surface of the hollow cylinder, as before specified.

2. I claim the application of centrifugal force to this purpose applied in the manner set forth.

WM. C. GRIMES.

Witnesses:
JACOB GLESSNER,
SAML. ZIEGLER.